Nov. 22, 1960     E. W. STEVENS     2,961,198
AIRCRAFT POWER PLANT

Filed Jan. 29, 1957     5 Sheets-Sheet 3

INVENTOR.
EMERSON W. STEVENS
BY
Beau, Brooks, Buckly & Beau,
ATTORNEYS

Nov. 22, 1960  E. W. STEVENS  2,961,198
AIRCRAFT POWER PLANT

Filed Jan. 29, 1957  5 Sheets-Sheet 4

INVENTOR.
EMERSON W. STEVENS
BY
Beau, Brooks, Buckley & Beau.
ATTORNEYS

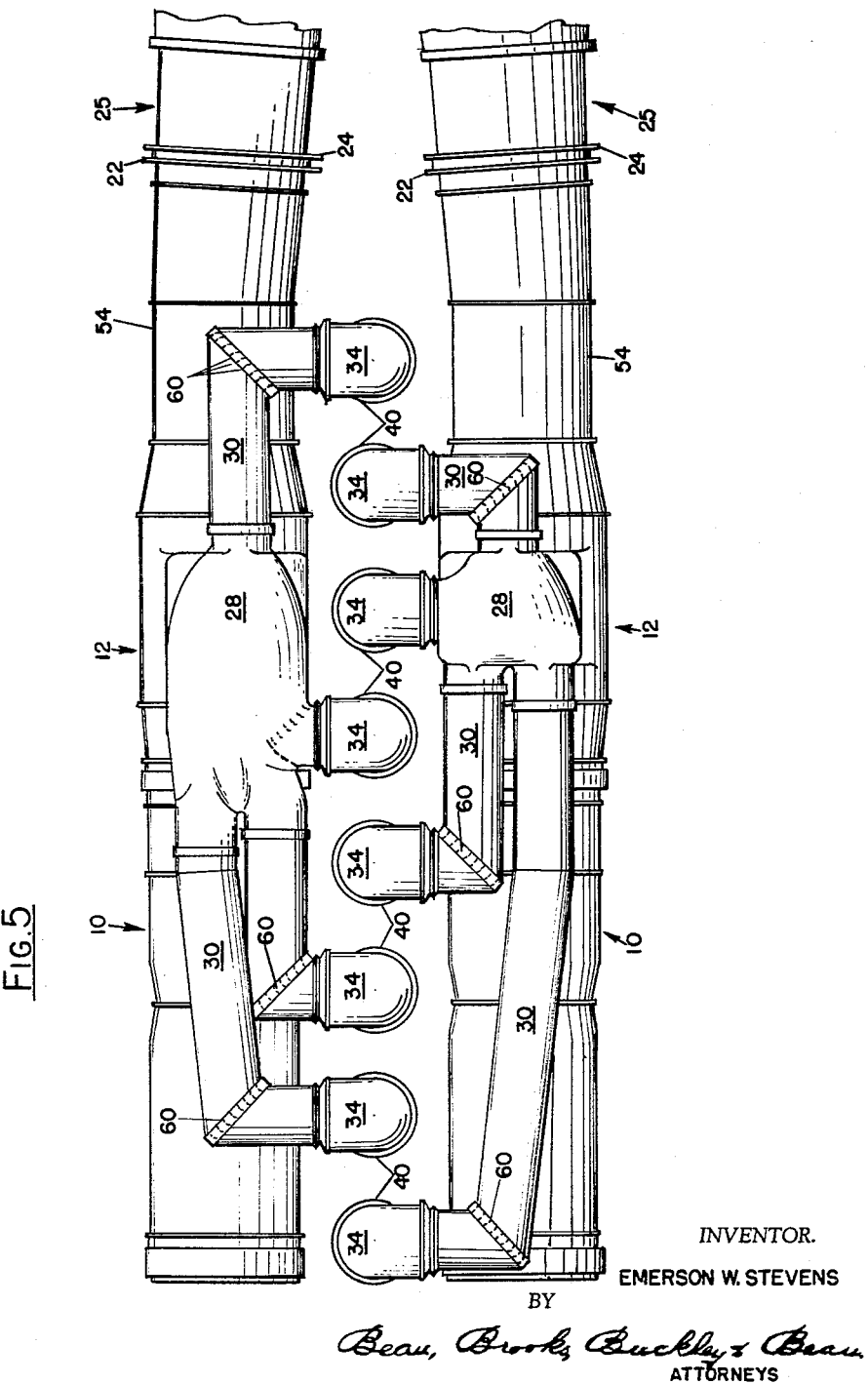

United States Patent Office 2,961,198
Patented Nov. 22, 1960

2,961,198

AIRCRAFT POWER PLANT

Emerson W. Stevens, Snyder, N.Y., assignor, by mesne assignments, to Bell Aerospace Corporation, Wheatfield, N.Y., a corporation of Delaware Filed Jan. 29, 1957, Ser. No. 636,940

2 Claims. (Cl. 244—74)

This invention relates to improvements in power plants for aircraft of the type designed to take off and land vertically while remaining in horizontal attitude; the invention being particularly directed to improvements in means utilizing the power of gas turbine-jet engines for such aircraft as disclosed in U.S. patent application Serial No. 534,532, now Patent No. 2,912,188, filed Sept. 19, 1955, and specifically to the means therein for selective adjustments of the direction of the engine thrust overall output between horizontal and vertical directions.

It is a primary object of the present invention to provide an improved gas turbine-jet type aircraft engine including means for adjusting in improved manner the direction of the thrust outputs from the engine jet nozzles.

Another object is to provide in a multi-nozzle aircraft jet engine improved means whereby to adapt the engine to selective operation either as a directionally stabilized horizontal thrust engine or as a directionally stabilized vertical thrust engine.

Another object is to provide in an aircraft a novel multi-jet engine arrangement having its overall thrust output centered in the aircraft when directed either vertically or longitudinally, in improved manner.

Another object is to provide in an engine as aforesaid an improved gas flow diverting valve and multiple reheat afterburner and thrust nozzle system requiring minimum engine frontal area and improved coordination of the nozzle outputs under all operative conditions, so as to obtain improved performance and optimum attitude and directional stabilization of the aircraft when rising, hovering, cruising, or landing.

Other objects and advantages of the invention will appear from the specification hereinafter.

Figure 4:
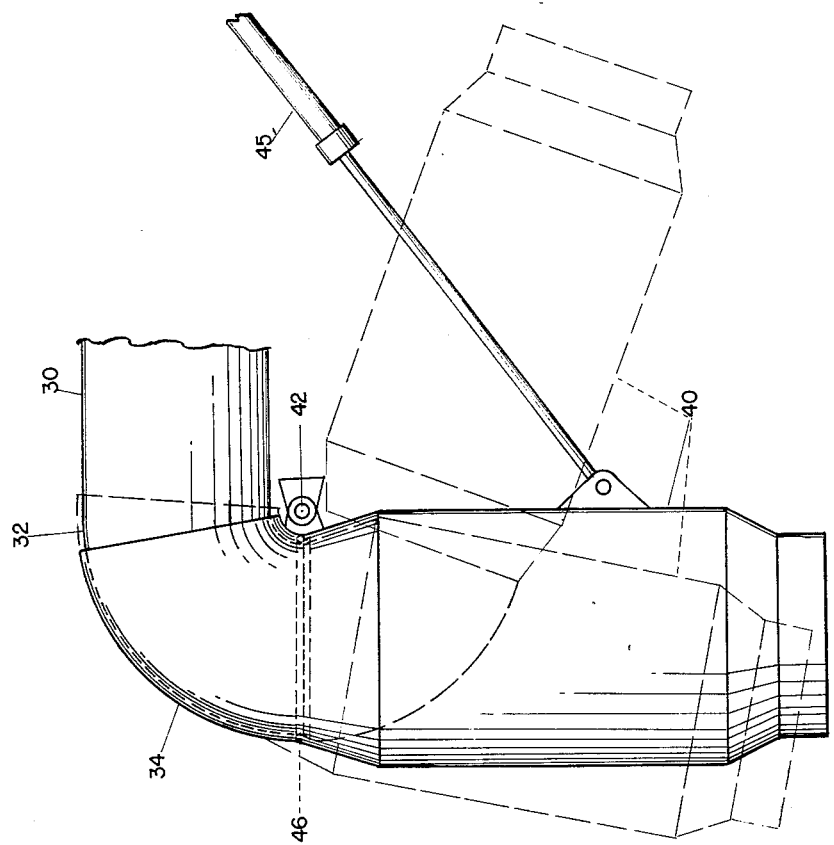

Fig. 4 is a fragmentary elevational view through one of the auxiliary afterburner thrust chamber devices and showing its swing control mechanism, the thrust chamber being illustrated in its variously adjustable positions to direct the thrust outputs thereof between vertical and substantially horizontal directions; and Fig. 5 is a plan view of a novel multi-jet engine arrangement of the invention, centering the overall thrust output in the vertical longitudinal plane of the aircraft, in improved manner.

The invention contemplates generally, provision in an airplane having one or more turbine-jet type engines of conventionally placed and fixedly directed "axial" or horizontal afterburners and a plurality of alternatively employable "reheat" or auxiliary afterburners relatively spaced about the airplane pitch, roll, and yaw axes. The auxiliaries are directionally variable between substantially horizontal and vertical attitudes, and hence the airplane is maneuverable either vertically or horizontally as in normal flight, while the airframe remains in horizontal attitude. Further, it is contemplated to make provision for pilot-selective alternative operation of the axial afterburner and the swiveling reheat chambers in conjunction with vertical or horizontal flight maneuvers, through manipulations of suitable flight control devices, whereby the pilot obtains stability control as well as directional control.

Thus, for example, as illustrated in Figs. 1–4 inclusive, a single power plant arrangement of the present invention may be constructed to be adapted for mounting in the airplane to lie generally horizontally along the plane of symmetry of the airplane. The particular form of power plant illustrated herewith utilizes a basic engine 10 of any suitable gas turbine type, such as either the turbojet, the ducted fan or turbo-fan type; having its turbine enclosed within an aft casing portion 12 terminating in a rear flange 14. Whereas, conventionally the engine flange 14 is designed for coupling to the front flange of an "axial" afterburner, in the case of the present invention it is coupled instead to the front flange 16 of a cylindrical casing 18 forming the body portion of a "vertiburner" which is designated generally at 20. In turn the casing 18 terminates at its rear end in a flange 22 which couples to the front flange 24 of the "axial" afterburner designated generally at 25.

The vertiburner casing 18 is enlarged at its mid-section to provide a plenum chamber 26 leading into a manifold 28 from which branch six ducts 30 each terminating in a positionally fixed downwardly directed elbow 32. The elbows 32 are received telescopically within correspondingly larger elbows 34 fixed to the upper ends of six corresponding "reheat" or auxiliary combustion chambers designated 40. The thrust chambers 40 are pivotally connected to fixed structure by means of pivot bearings 42 carried by brackets 44; and the elbows 32, 34 are relatively gas-sealed by means of suitable seals as indicated at 46. Thus, it will be understood that upon rotation of the combustion chambers 40 upon their pivots 42 they will be thereby swung alternatively between substantially horizontally and rearwardly pointed directions, and vertically and downwardly pointed directions; as illustrated for example by the broken and solid line showings thereof in Fig. 4. Throughout such swivelling motions of the chambers 40 they remain in open communication with the plenum chamber and duct system. To provide for such rotation of the combustion chambers 40, they may of course be driven by any suitable means under control of the aircraft pilot; such as for example by means of hydraulic jacks as indicated at 45 (Fig. 1) operating through connecting rods or the like as indicated at 46. A crank arm 47 and torque shaft 48 is preferably provided to interconnect and synchronize motions of the combustion chambers at opposite sides of the engine, while brackets 49—49 support the torque shaft 48.

Figure 2:
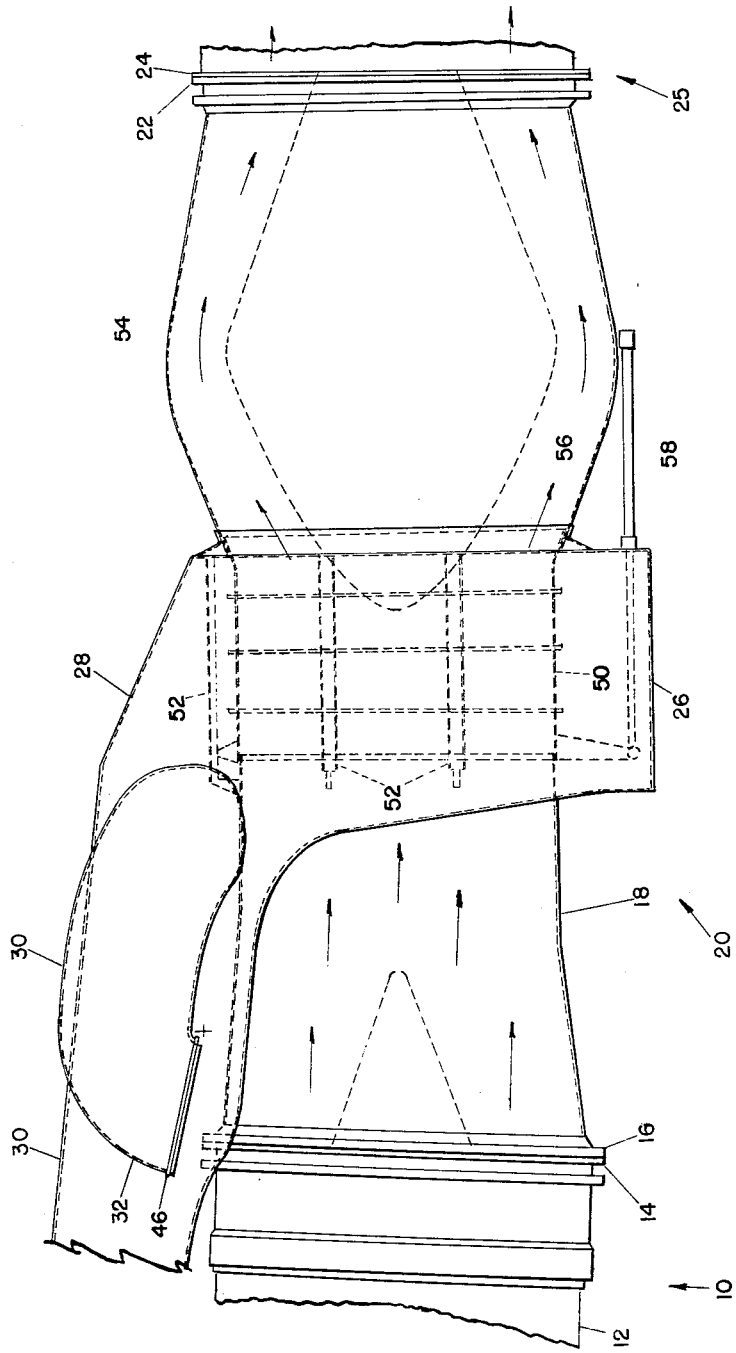
Fig. 2 is a fragmentary side elevational view of a portion of the engine of the invention showing the diversion control valve set in position for delivery of the engine turbine discharge gas to the usual afterburner arrangement for horizontal thrust.
Figure 3:
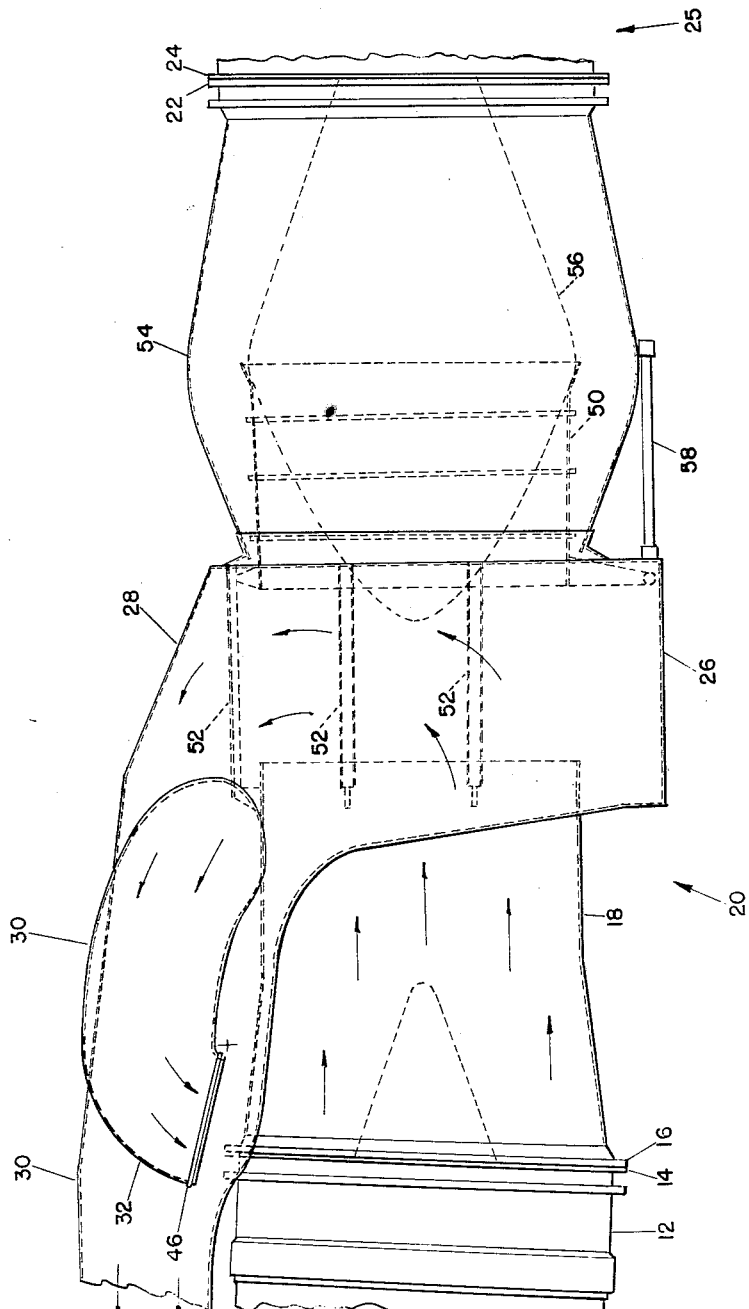
Fig. 3 is a view corresponding to Fig. 2, but showing the valve set to divert turbine discharge gas to the vertically swingable afterburner components of the engine.

To provide for pilot controlled alternative operation of the axial afterburner 25 and the auxiliary reheat burners 40, a sliding valve member of generally cylindrical collar form as indicated at 50 (Figs. 2, 3) is provided interiorly of the plenum chamber 26, and is mounted on longitudinal slide tracks 52 so as to be alternatively slidable between chamber closing position as shown in Fig. 2, and open position as shown in Fig. 3. The vertiburner section 20 includes a bulbous shaped rear end portion 54 interiorly of which is disposed a closed nose or core 56 thereby defining between the shell 54 and the core 56 an annular passageway for the turbine discharge into the axial afterburner 25. The valve sleeve 50 is dimensioned at its front end so as to telescopically slip-fit over the aft end portion of the shell 18 carrying the turbine discharge when the sleeve 50 is closed relative to the shell 18.

Thus, as shown in Fig. 2, when the valve 50 is in its "closed" position, the turbine discharge gases are conveyed thereby through the aft duct 54 into the afterburner 25. However, whenever the valve sleeve 50 is displaced rearwardly, as to the position shown in Fig. 3, the valve 50 thereby closes at its rear end against the enlarged body portion of the core 56, thereby sealing off the annular passageway to the afterburner 25, and at the same time opening the passageway leading into the plenum chamber 26 whereby the turbine gases may flow thereinto and through the ducts 30 into the reheat combustion chambers 40. To actuate the valve sleeve 50 between open and closed positions, any suitable means may of course be employed, such as a hydraulic jack and strut device as indicated at 58 (Figs. 2, 3).

Figure 1:
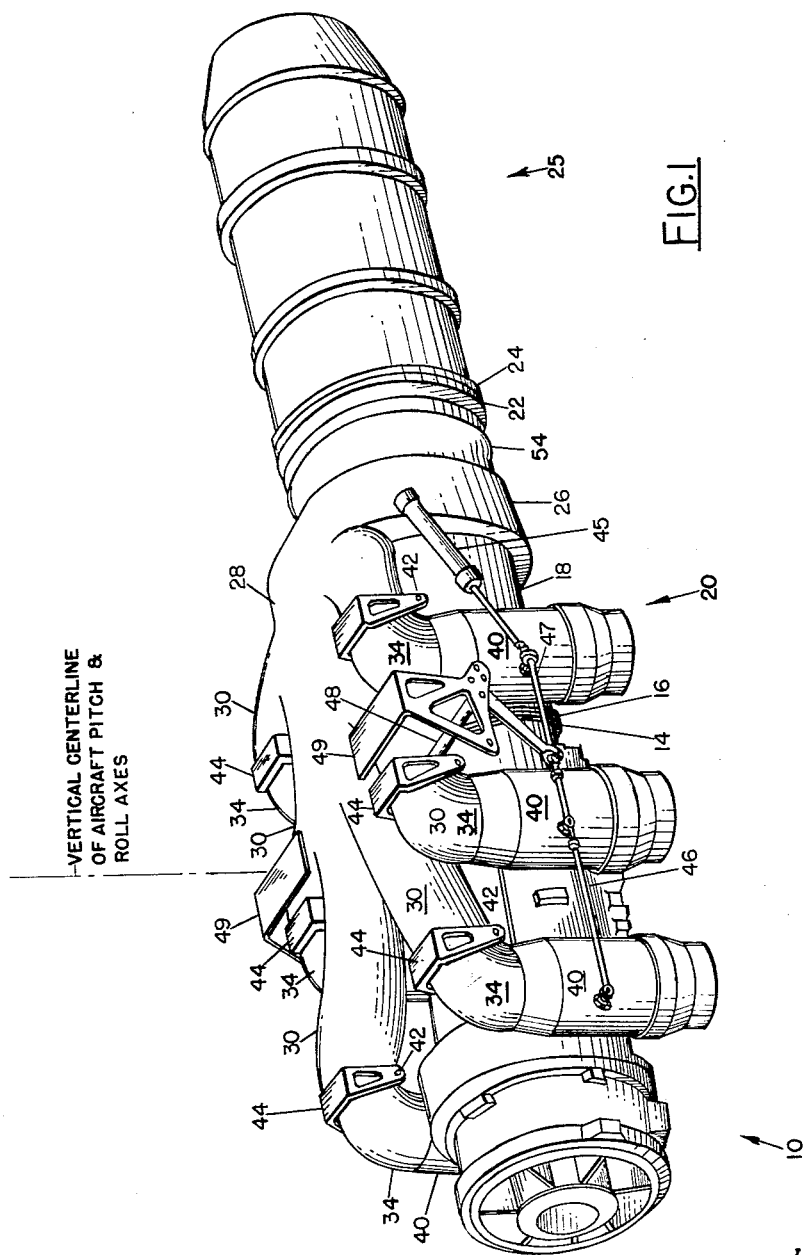
Fig. 1 is a top and side elevational perspective view of a power plant embodying an aircraft engine arrangement of the present invention.

Thus, it will be appreciated that in the case of the single power plant installation of Fig. 1, by operation of simple controls actuated either automatically or responsive to pilot manual control motions, the power plant is readily convertible between vertical thrust and horizontal thrust operations. Thus, for example, when it is desired to put the aircraft into a take-off maneuver, it may be controlled to take off either in the manner of a conventional aircraft subsequent to a suitable take-off run while in horizontal attitude, provided a runway of sufficient length is available. Or, in the alternative, it may be caused to fly straight upwardly while still remaining in horizontal attitude, until such time as the desired cruising altitude is attained. In the first case, the maneuver may be effected by simply closing the plenum valve 50 to the position thereof shown in Fig. 2, whereupon the turbine-jet engine will operate in conventional manner so as to drive the aircraft forwardly and down the runway for take-off in accord with conventional fixed wing aircraft take-off practice. In the absence of an available runway however, the plenum valve 50 may be simply moved to the open position thereof shown in Fig. 3, whereupon the afterburner 25 will be inactivated and the turbine-jet gases will be thereby directed through the combustion chambers 40 in downward directions so as to lift the aircraft in a horizontal attitude until such time as the desired cruising altitude is attained. For this maneuver, the control device 45 will of course be actuated so as to swing the combustion chambers 40 downwardly to substantially vertically directed attitudes as shown in Figs. 1 and 4. Then, upon attainment of sufficient altitude, the plenum chamber valve 50 may be displaced forwardly as to the position thereof shown in Fig. 2 whereupon the turbine thrust will be directed rearwardly through the afterburner and thence from the discharge nozzle thereof in rearwardly horizontal direction, thereby driving the aircraft forwardly.

Transition from vertical or hovering flight into horizontal forward flight may be easily effected by simply closing the valve 50. To improve the flight efficiency in this latter phase of the operation, the auxiliary combustion chambers 40 will then be withdrawn upwardly into the fuselage by actuation of the device 45, so as to draw the combustion chambers upwardly as into the right hand broken line showing thereof in Fig. 4.

Reversely, with respect to the landing operation, if a sufficiently long runway is available the aircraft may be landed in accord with conventional fixed wing aircraft landing practice. On the other hand, if only a short field is available the aircraft may be brought into position thereover while the auxiliary combustion chambers 40 are pivoted downwardly and initially slightly forwardly as to the left hand broken line position thereof shown in Fig. 4 to check the forward speed. The plenum valve 50 is then controlled to move rearwardly as to the position shown in Fig. 3 whereupon the turbine discharge will be bypassed through the plenum chamber into the auxiliary chambers 40 and from thence will blast downwardly so as to provide a vertical lift force. Thence, the aircraft may be lowered gently to the landing area by suitable control of the turbine blast to the auxiliary chambers 40.

Whereas, the arrangement of Figs. 1–4 described hereinabove embodies the invention in the form of a single power plant installation in an aircraft, Fig. 5 illustrates how a pair of engines may be installed as a single power plant unit in an aircraft. Again, it is a particular feature that the power plant discharge thrusts are at all times centered on the longitudinal vertical plane of symmetry of the aircraft. As shown in Fig. 5, which is a plan view of a dual engine power plant unit, under normal forward flight conditions the turbine thrust forces are dispensed through axial afterburners directed rearwardly and paired so as to straddle the vertical plane of symmetry of the aircraft, so as to thereby drive the aircraft forwardly without yawing tendencies. The dual power plants are preferably so arranged to nest closely together, thereby bringing close together the afterburner discharge nozzles.

When the engines are operated to divert their turbine thrust forces through the plenum chambers into the auxiliary combustion chambers, the latter direct their thrust forces vertically downwardly along the plan view center line of the airplane. Hence, no roll inducing couples are generated. Furthermore, the power plant is appropriately centered longitudinally of the airplane at the longitudinal station of the center of gravity thereof, and hence there will be no pitch inducing couples generated by operation of the auxiliary combustion chambers because they are numerically equalized and centered about the longitudinal center of gravity of the aircraft. Attention is called to the fact that as shown in Fig. 5, the ducts 30 conveying the turbine discharge gases to the auxiliary combustion chambers 40 are preferably provided at their elbow portions with flow guiding vanes 60, preventing turbulence and eddy current losses therein.

I claim:

1. An aircraft jet engine power plant of the turbo-jet type having axially aligned turbine and primary afterburner means disposed symmetrically relative to the vertical plane of symmetry of the aircraft through the longitudinal axis theerof, and auxiliary reheat afterburner means communicating with the output of said turbine at a point between said turbine and said primary afterburner means and operable alternatively to said primary afterburner means, said auxiliary reheat afterburner means being swingable between horizontally and vertically directed attitudes while remaining symmetrically disposed relative to the vertical plane of symmetry through the longitudinal center line of the aircraft.

2. An aircraft jet engine power plant of the turbo-jet type having axially aligned turbine and primary afterburner means disposed symmetrically relative to the vertical plane of symmetry of the aircraft through the longitudinal axis thereof, auxiliary reheat afterburner means swingable between horizontally and vertically directed attitudes while remaining symmetrically disposed relative to the vertical plane of symmetry through the longitudinal center line of the aircraft, said auxiliary reheat afterburner means communicating with the output of said turbine means at a point between said turbine means and said primary afterburner means, and slide valve means interposed between said turbine means and said primary afterburner means and operable alternatively to connect said turbine output to said auxiliary reheat afterburner means and said primary afterburner means.

References Cited in the file of this patent

UNITED STATES PATENTS

| | | |
|---|---|---|
| 2,501,078 | Newcomb | Mar. 21, 1950 |
| 2,601,104 | Douglas | June 17, 1952 |
| 2,652,216 | Hoffman | Sept. 15, 1953 |
| 2,774,554 | Ashwood | Dec. 18, 1956 |
| 2,857,740 | Hall | Oct. 28, 1958 |

FOREIGN PATENTS

| | | |
|---|---|---|
| 732,978 | Great Britain | July 6, 1955 |
| 860,754 | Germany | Dec. 22, 1952 |